(12) United States Patent
Yamaguchi et al.

(10) Patent No.: US 8,985,764 B2
(45) Date of Patent: Mar. 24, 2015

(54) CONTACT LENS

(75) Inventors: Hiroyuki Yamaguchi, Tajimi (JP);
Shingo Hibino, Kani (JP); Yukihisa Sakai, Toyohashi (JP)

(73) Assignee: Menicon Co., Ltd., Aichi (JP)

( * ) Notice: Subject to any disclaimer, the term of this patent is extended or adjusted under 35 U.S.C. 154(b) by 322 days.

(21) Appl. No.: 13/503,784

(22) PCT Filed: Nov. 17, 2009

(86) PCT No.: PCT/JP2009/006172
§ 371 (c)(1),
(2), (4) Date: Apr. 24, 2012

(87) PCT Pub. No.: WO2011/061790
PCT Pub. Date: May 26, 2011

(65) Prior Publication Data
US 2012/0206692 A1 Aug. 16, 2012

(51) Int. Cl.
*G02C 7/04* (2006.01)
(52) U.S. Cl.
CPC ....................................... *G02C 7/048* (2013.01)
USPC ...................................................... 351/159.36
(58) Field of Classification Search
CPC .......... G02C 7/04; G02C 7/041–7/045; G02C 7/048–7/049; G02C 7/06–7/061
See application file for complete search history.

(56) References Cited

U.S. PATENT DOCUMENTS

| | | | | |
|---|---|---|---|---|
| 4,859,049 | A | * | 8/1989 | Muller ..................... 351/159.74 |
| 5,100,225 | A | * | 3/1992 | Rothe ...................... 351/159.19 |
| 5,166,710 | A | | 11/1992 | Hofer et al. |
| 5,455,641 | A | | 10/1995 | Hahne et al. |
| 5,650,837 | A | | 7/1997 | Roffman et al. |
| 5,912,719 | A | | 6/1999 | Baude et al. |
| 2002/0021409 | A1 | | 2/2002 | Marmo |
| 2003/0151718 | A1 | | 8/2003 | Marmo et al. |
| 2005/0146679 | A1 | | 7/2005 | Marmo et al. |

(Continued)

FOREIGN PATENT DOCUMENTS

| | | |
|---|---|---|
| EP | 0 866 354 A1 | 9/1998 |
| EP | 0 980 015 A1 | 2/2000 |

(Continued)

OTHER PUBLICATIONS

Japanese Office Action issued in Application No. 2011-541731; Dated Jan. 21, 2013 (With Translation).

(Continued)

*Primary Examiner* — Ricky Mack
*Assistant Examiner* — Robert E Tallman
(74) *Attorney, Agent, or Firm* — Oliff PLC

(57) ABSTRACT

Provided is a contact lens of double thin type ensuring a comfortable wearing sensation, enabling improvement of oxygen permeability and tear exchange, and having a novel structure. An optical zone having no deviation of a center of gravity by a prism is formed. A pair of thin portions extending circumferentially and having a constant thickness are formed on both upper and lower sides of a peripheral zone, and a pair of thick portions extending circumferentially and having a thickness larger than that of the thin portions are formed on both left and right sides. One or more concavities are positioned symmetrically in a left-right direction during wear in a posterior surface of each of the thick portions. A minimum thickness at a portion where the concavity is formed is larger than the thickness of the thin portions.

15 Claims, 9 Drawing Sheets

(56) References Cited

U.S. PATENT DOCUMENTS

| | | |
|---|---|---|
| 2005/0259220 A1 | 11/2005 | Neadle et al. |
| 2006/0203190 A1 | 9/2006 | Marmo et al. |
| 2007/0139610 A1* | 6/2007 | Neadle et al. ............ 351/160 H |

FOREIGN PATENT DOCUMENTS

| | | |
|---|---|---|
| JP | A-05-034644 | 2/1993 |
| JP | A-06-018821 | 1/1994 |
| JP | A-08-304745 | 11/1996 |
| JP | A-2000-089172 | 3/2000 |
| JP | A-2005-500554 | 1/2005 |
| JP | A-2007-503017 | 2/2007 |
| JP | A-2007-538288 | 12/2007 |
| WO | WO 2005/019907 | 3/2005 |

OTHER PUBLICATIONS

International Search Report issued in Application No. PCT/JP2009/006172; Dated Dec. 22, 2009 (With Translation).

Jun. 12, 2012 International Preliminary Report on Patentability issued in Application No. PCT/JP2009/006172.

Supplementary European Search Report issued in Application No. 09851416.9; Dated Apr. 5, 2013.

* cited by examiner

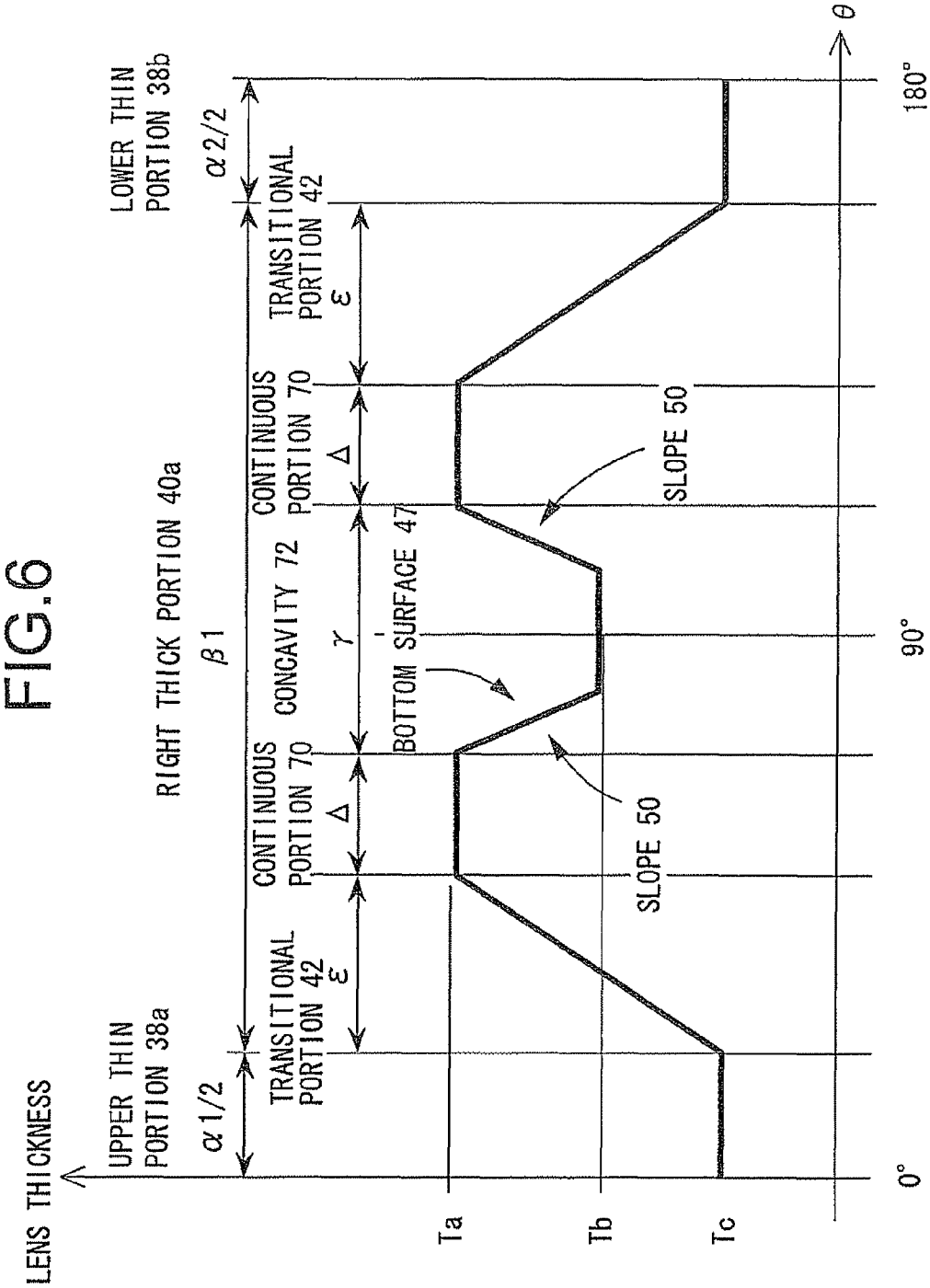

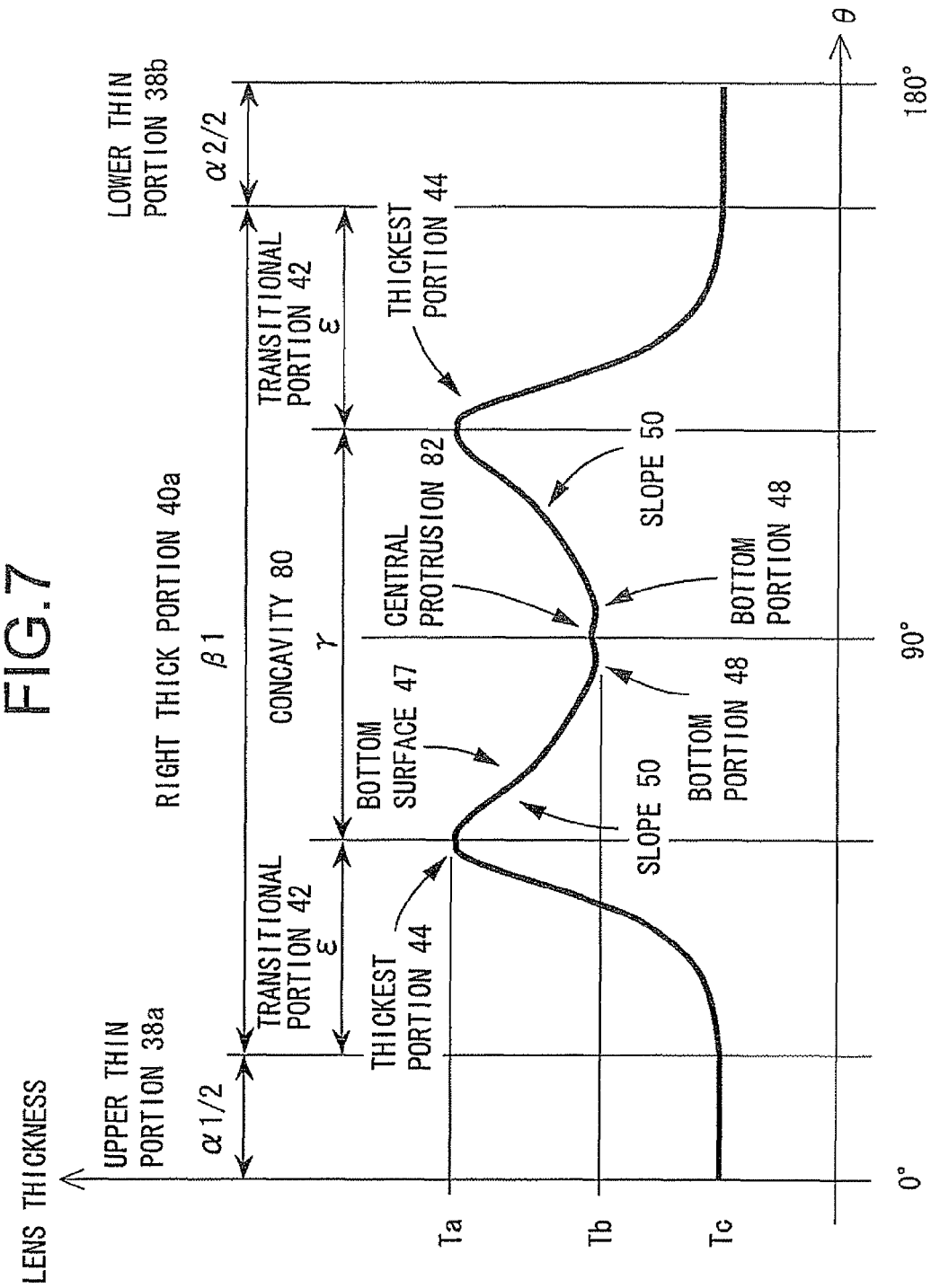

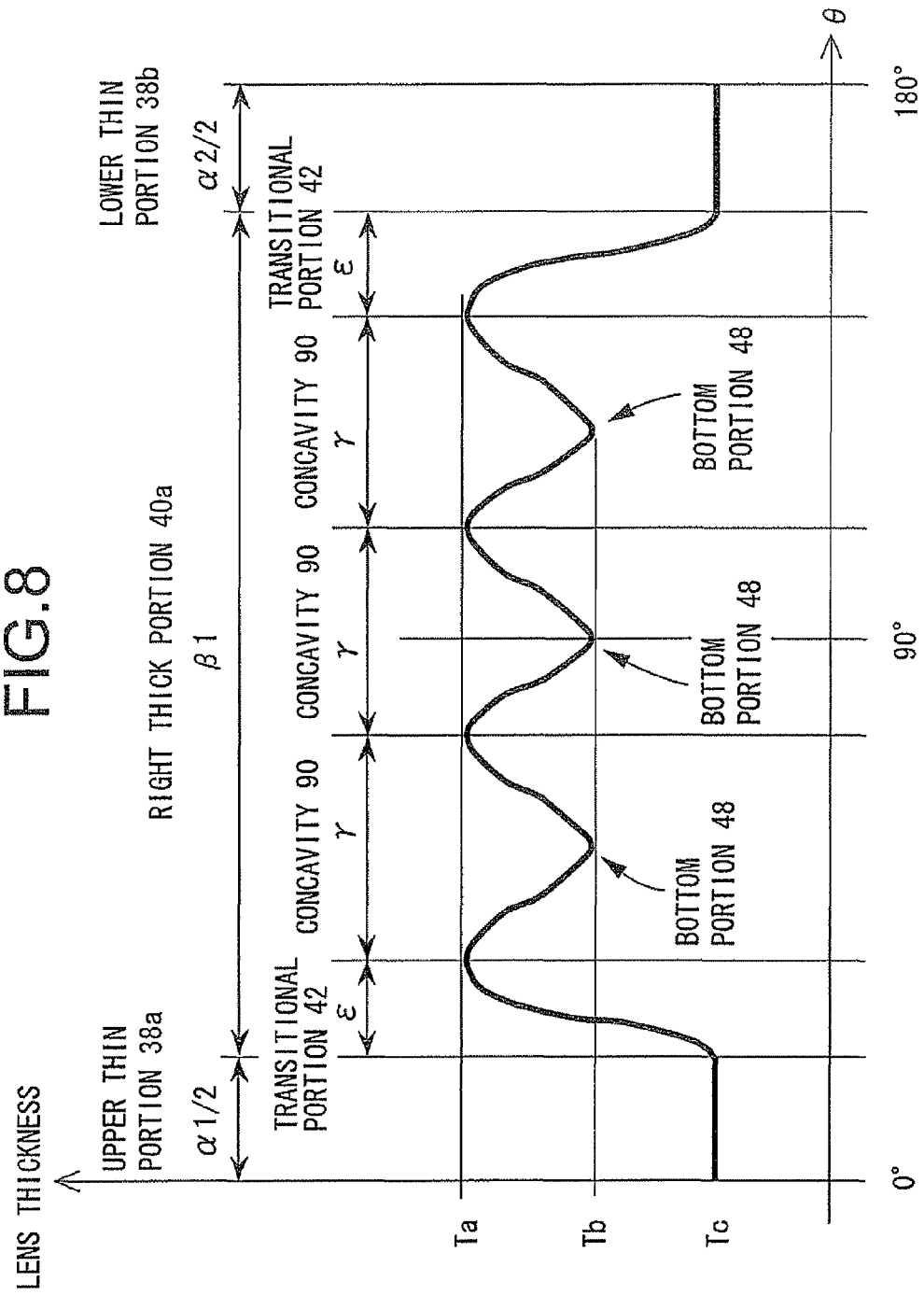

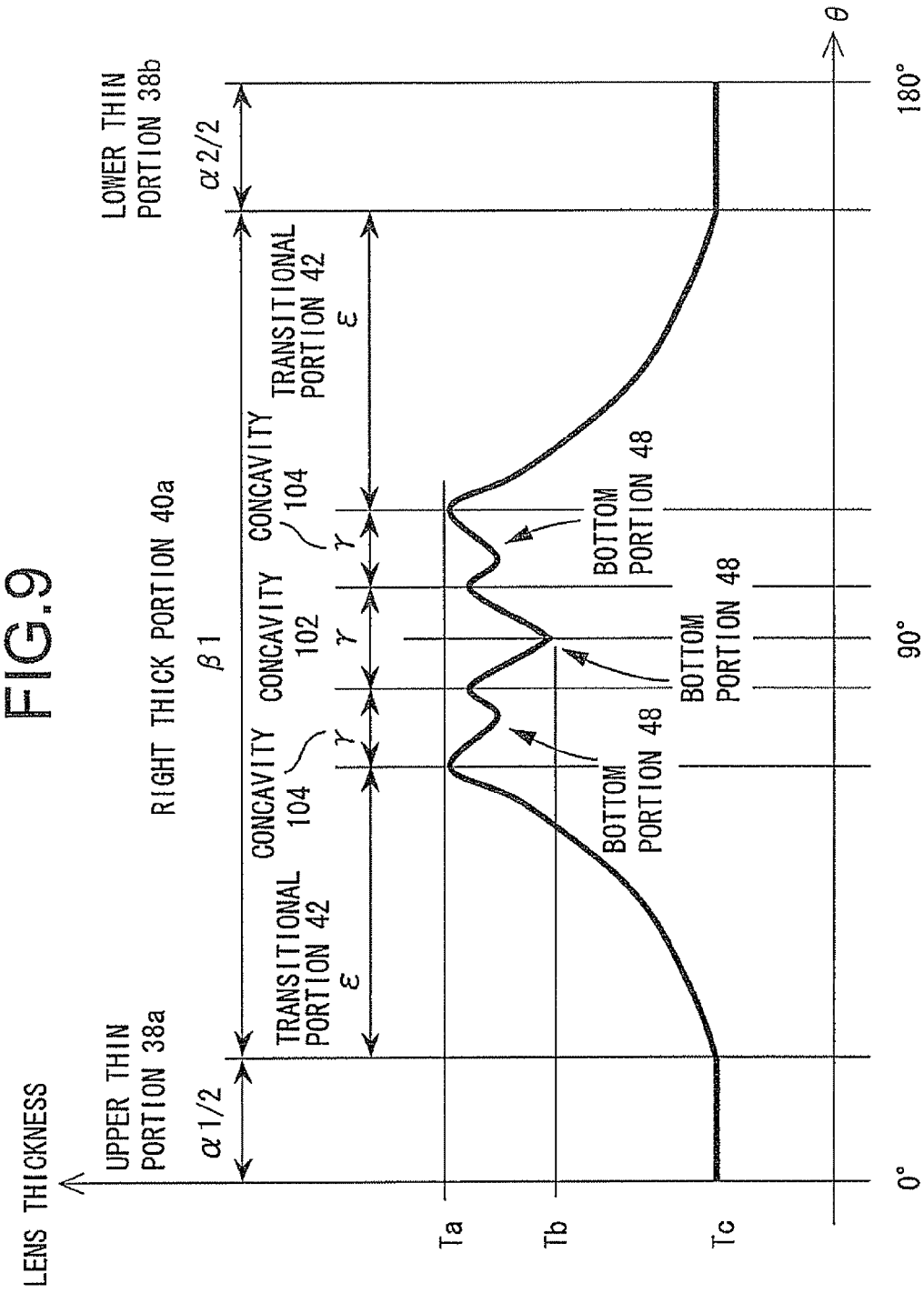

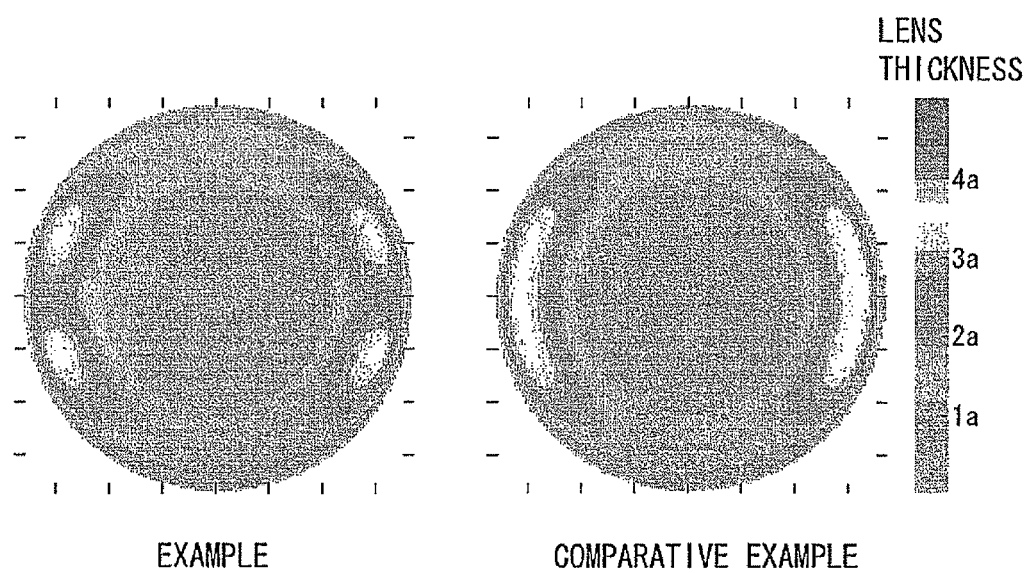

CONTACT LENS

TECHNICAL FIELD

The present invention relates to a contact lens including the hard type and soft type, more specifically to a double-thin type contact lens with its upper and lower sides made thinner than the left and right sides.

BACKGROUND ART

Soft type and hard type contact lenses have conventionally been used for the purpose of vision corrections of myopia, hyperopia, astigmatism and presbyopia and the like.

Since these contact lenses are worn over the sensitive corneal surface, it is required to achieve a comfortable wearing sensation by alleviating the foreign-body sensation. In order to enhance the wearing sensation, one can consider adopting a double-thin type lens with its upper and lower sides made thinner than the left and right sides in the peripheral zone located along the peripheral part of the optical zone. Thinning the upper and lower sides makes it possible to reduce the pressure from the eyelids and restrict the foreign-body sensation. Also, since taking advantage of the action of interference with the eyelids can prevent the contact lens during wear from turning around, such can be favorably applied to tonic lenses and the like. See Patent Document 1 (Japanese Publication of PCT International application No. JP-A-2007-503017) and Patent Document 2 (Japanese Patent Publication No. JP-A-2000-89172), for example.

However, in case of a double-thin type contact lens, there was a problem of hardly being able to maintain enough oxygen permeability and tear exchange. In other words, in case of a double-thin type contact lens, the left and right sides in the peripheral zone are made relatively thick so that the oxygen permeability tends to drop down. Moreover, since the amount of lens displacement over the corneal surface caused by blinking tends to get smaller to reduce the tear exchange by making the upper and lower sides in the peripheral zone so thin as to get under the eyelids, supply of oxygen to the cornea due to tear exchange tends to be lower. In addition, because of the reduced tear exchange, there was a problem of difficulties in removing the impurities including waste materials such as lactic acid and dead epithelial cells as well as bacteria and the like, for example, generated by corneal metabolism, or even air bubbles trapped between the cornea and the lens during wear and so forth.

BACKGROUND ART DOCUMENTS

Patent Documents

Patent Document 1: JP-A-2007-503017
Patent Document 2: JP-A-2000-89172

SUMMARY OF THE INVENTION

Problem the Invention Attempts to Solve

The present invention has been developed in view of the circumstances described above as the background, and it is one object of the present invention to provide a contact lens with a novel structure that can improve oxygen permeability and tear exchange while keeping a comfortable wearing sensation of the double-thin type.

Means for Solving the Problem

Modes of the present invention designed to solve the above problem are described below. The structural elements adopted in each of the described modes are adoptable in as many combinations as possible.

A first mode of the present invention provides a contact lens including a central optical zone and a peripheral zone surrounding the optical zone, the contact lens being characterized in that: the optical zone has no deviation of a center of gravity by a prism; a pair of thin portions are each formed in the peripheral zone extending in a circumferential direction with a constant thickness on upper and lower sides of the lens during wear; a pair of thick portions are each formed in the peripheral zone extending in the circumferential direction with a larger thickness than the thin portions on left and right sides of the lens during wear; a posterior surface of each of the pair of thick portions has at least one concavity such that respective concavities are positioned symmetrically in a left-right direction during wear; and a minimum thickness at a portion where the concavity is formed is larger than the thickness of the thin portions.

According to the present invention, by means of forming the concavity in the thick portion, excess material is shaved off therefrom to partially reduce the thickness of the thick portion. This makes it possible to restrict the pressure of the thick portion and alleviate the foreign-body sensation. Especially because the concavity opens up on the posterior surface of the lens, if there is any pinguecula at the wearing eye, for example, the pressure of the thick portion can be reduced by forming a concavity at the location corresponding to the pinguecula, thus achieving an even more comfortable wearing sensation. At the same time, oxygen permeability of the thick portion can be improved by means of partially reducing the thickness thereof by the concavity.

Besides, since the concavities are formed symmetrically in the left-right direction during wear, the partially weakened portions in the left and right thick portions are each positioned equally in the vertical direction during wear. This generates flexural deformation of the lens caused by blinking folding it in the up-down direction during wear. This flexural deformation and restoration from it can increase the amount of displacement of the lens over the cornea. Therefore, the pumping action can be exerted more effectively to further improve the tear exchange. As a result, more healthy conditions of the cornea can be maintained, while impurities and air bubbles can be removed more rapidly, and the wearing sensation can be further enhanced.

In addition, it is possible to alleviate uneven distribution of the rigidity along the peripheral part of the lens caused by the thickness difference between the thick and thin portions to improve the shape retention capacity of the lens by means of forming a concavity in the thick portion and making the thickness at the formation of the concavity closer to that of the thin portion. This alleviates the problem of having the lens curled up on one's finger in an attempt to wear it.

Moreover, by means of making the minimum thickness at the formation of the concavity larger than the thickness of the thin portion, it is possible to achieve the alleviating effect of the foreign-body sensation and the improving effect of oxygen permeability as mentioned above, while keeping the strength at the formation of the concavity to some extent.

Now, since the lens as a whole is made in a form of a double-thin type with the thin portions on the upper and lower sides and the thick portions on the left and right sides, the effect of turn restrictions can be maintained at almost the same level as the conventional double-thin type, which ensures its favorable applicability to lenses such as tonic lenses, for example, having a particular axis set in the radial direction in connection with the optical properties.

In addition, since the thickness of the thin portion is made constant in the circumferential direction, partial formation of an especially thin and weak portion within the thin portion can be avoided, thus enabling to secure the minimum thickness to some extent at the thin portion. This makes it possible to effectively maintain the strength of the lens as a whole including the thin portion. Also, when the eyelid comes over the thin portion of the lens, a risk of less comfortable wearing sensation produced by local stimuli caused by partially different thicknesses of the thin portion is reduced. In addition, since the thin portion is made in a thin form with a constant thickness all the way along the periphery, it is now possible to keep the thin portion under a condition of being tucked under the eyelid for a long stretch in the circumferential direction, thus enabling to improve the stability of the lens in the circumferential direction by virtue of tucking it under the eyelid.

Moreover, since the optical zone has no deviation of the center of gravity like a prism, the thickness of the optical zone can be reduced. This helps to avoid the problem of the deteriorated wearing sensation, when the conventional prism ballast method is used, and to obtain a better wearing sensation.

Further, since the prism ballast method is not adopted herein, there is no risk of any optical adverse effect caused by prism setting of the optical zone like in the conventional contact lens using the prism ballast method. In other words, according to the lens of the present mode, desired vision corrections can be achieved at high precision at the optical zone without being adversely affected by a significant prism setting for deviation of the center of gravity (the conventional prism ballast).

Meanwhile, the thickness along the peripheral zone of a contact lens is to be set up variably in the radial direction of the lens, and in general, it is made smaller toward the outer periphery in the radial direction. Given that, in comparing the thickness of the thick and thin portions and the like with each other in this specification, the dimensions should be measured along the same circumference around the geometric center of the lens. More specifically, larger thickness at the thick portion than the thin portion means that the thickness of the thick portion is larger than that of the thin portion when the dimensions are compared at the same distance away from the geometric center of the lens in the radial direction.

A second mode of the present invention provides the contact lens according to the first mode, wherein one of the at least one concavity in each of the pair of thick portions is formed on a horizontal radial line extending in the left-right direction through a lens central axis during wear.

According to this mode, since the concavity is formed at the center of the thick portion in the circumferential direction, the oxygen permeability of the thick portion at its center in the circumferential direction can be improved effectively. In addition, forming a concavity at the center in the up-down direction of the lens during wear and reducing its strength makes it possible to effectively generate flexural deformation caused by blinking, thus further improving the tear exchange.

A third mode of the present invention provides the contact lens according to the first or second mode, wherein the pair of thin portions located on the upper and lower sides of the lens during wear and the pair of thick portions located on the left and right sides of the lens during wear are formed symmetrically with respect to two radial lines, that is, the horizontal radial line extending in the left-right direction through the lens central axis during wear, and a vertical radial line extending in an up-down direction through the lens central axis during wear, including the concavity formed in each of the pair of thick portions.

According to this mode, since the thick portion including the concavity is formed symmetrically with respect to the vertical radial line, it is possible to position the concavities formed on each of the left and right thick portions equally in the up-down direction, thus making it easier to generate flexural deformation in response to the action of blinking. At the same time, forming the thick portions including the concavities symmetrically with respect to the horizontal radial line makes it possible to position the concavity at each of the left and right thick portions in a good balance in the up-down direction, thus generating the oxygen permeability effect by the concavity in a good balance in the up-down direction of each of the left and right thick portions. Also, since the thickness along the peripheral zone of the lens during wear can be set in a good balance in both up-down and left-right directions, a better effect of turn restrictions can be obtained, which can be adopted favorably by the lens and the like that requires positioning in the circumferential direction during wear.

A fourth mode of the present invention provides the contact lens according to any one of the first through third modes, wherein the minimum thickness at the portion where the concavity is formed is held within a range of ½ to 9/10 of a maximum thickness of the thick portions.

Setting the minimum thickness of the concavity at ½ or more of the maximum thickness of the thick portion can avoid making the thick portion at the formation of the concavity too thin so as to maintain the morphological stability of the lens, while there is no need for forming a concavity with too large a depth. This makes the fabrication of plastic molds for contact lenses and metal molds for casting the molds easier in the process of manufacturing contact lenses. On the other hand, setting the minimum thickness of the concavity at 9/10 or less of the maximum thickness of the thick portion makes it possible to effectively obtain the effect of improving the oxygen permeability and tear exchange by virtue of the thinning at the formation of the concavity.

A fifth mode of the present invention provides the contact lens according to any one of the first through fourth modes, wherein both sides in the circumferential direction of the thick portions are made to be transitional portions that gradually thin out toward the thin portions.

By doing as described above, it is possible to alleviate abrupt changes in the thickness in the circumferential direction along the peripheral zone. This reduces unsmooth feelings felt by the upper and lower eyelids to enhance the wearing sensation. In addition, a better positioning effect in the circumferential direction can be obtained by a good balance of acting forces of the upper eyelid to push the lens following the actions of the upper eyelid that gradually rides over and backs down from the transitional portions.

A sixth mode of the present invention provides the contact lens according to the fifth mode, wherein a center of the thick portion in the circumferential direction is made to be a continuous portion that extends in the circumferential direction at a constant thickness, and a central angle $\Delta$ around the lens central axis in the continuous portion is set in a range of 40 to 70 degrees.

By setting the central angle $\Delta$ of the continuous portion at 40 degrees or more in the continuous portion, it is now possible to maintain an appropriate length of the continuous portion in the circumferential direction and to stably obtain a good weight balance between the left and right thick portions and an effect of the push-out action of the upper eyelid when blinking, whereas, by setting the central angle $\Delta$ of the continuous portion at 70 degrees or less, overlapping of the upper and lower eyelids over the continuous portion at the time of not blinking can be either reduced or avoided to enhance the wearing sensation of the lens.

A seventh mode of the present invention provides the contact lens according to the fifth or sixth mode, wherein the concavity is formed in a double tapered bottom surface that gradually decreases a depth thereof toward both sides in the circumferential direction, whereas an inclination angle of the concavity at the bottom surface in the circumferential direction is made equal to or larger than that of the transitional portion of the thick portion. This makes it possible to maintain a certain depth without increasing the dimension of the concavity in the circumferential direction, thus improving the design freedom of the concave form. This also makes it possible to increase the inclination of the concavity in the circumferential direction so as to achieve the centralization and better efficiency of the above flexural deformation and improve the pumping action while maintaining a comfortable wearing sensation of the lens by decreasing the inclination in the circumferential direction in the transitional portion.

An eighth mode of the present invention provides the contact lens according to any one of the first through seventh modes, wherein a central angle α around the lens central axis in the thin portions is set in a range of 20 to 60 degrees.

Since the thin portion of the lens can be formed in a given dimension in the circumferential direction by setting the central angle α of the thin portion at 20 degrees or more, overlapping of the upper and lower eyelids over the thick portion at the time of not blinking can be reduced to enhance the wearing sensation, and at the same time, oxygen permeability of the lens as a whole can be maintained by means of forming a thin portion in a given dimension with higher oxygen permeability than the thick portion in the circumferential direction. In addition, by setting the central angle α of the thin portion at 20 degrees or more, it is possible to avoid the situation where the length of the thick portion in the circumferential direction is relatively increased and the strength of the lens at the thick portion is excessively reinforced, thus stably generating flexural deformation caused by blinking. On the other hand, by setting the central angle α of the thin portion at 60 degrees or less, the length of the thick portion in the circumferential direction can be properly maintained so as to secure the strength of the lens, and at the same time, the effect of turn restrictions caused by the push-out action of the upper eyelid in blinking can be exerted in a stable manner.

A ninth mode of the present invention provides the contact lens according to any one of the first through eighth modes, wherein a central angle β around the lens central axis in the thick portions is set in a range of 120 to 160 degrees.

By setting the central angle β of the thick portion at 120 degrees or more, the effect of turn restrictions caused by the push-out action of the upper eyelid can be exerted in a stable manner. On the other hand, by setting the central angle β of the thick portion at 160 degrees or less, overlapping of the upper and lower eyelids over the thick portion can be avoided to enhance the wearing sensation, and at the same time, a thin portion in a given dimension with higher oxygen permeability than the thick portion in the circumferential direction can be formed to maintain oxygen permeability of the lens as a whole. In addition, potential difficulties in generating flexural deformation of the thick portion at the time of blinking caused by having an excessively large dimension thereof in the circumferential direction can be avoided or mitigated.

A tenth mode of the present invention provides the contact lens according to any one of the first through ninth modes, wherein a central angle γ around the lens central axis at the concavity is set in a range of 20 to 60 degrees.

By setting the central angle γ of the concavity at 20 degrees or more, the length of the concavity in the circumferential direction can be properly maintained to improve oxygen permeability at the thick portion, and at the same time, the flexural deformation can be generated more easily. On the other hand, by setting the central angle γ of the concavity at 60 degrees or less, the strength of the lens at the thick portion can be secured.

An eleventh mode of the present invention provides the contact lens according to any one of the first through tenth modes, wherein a minimum thickness of the thin portion is set in a range of 0.10 mm to 0.20 mm.

By setting the minimum thickness of the thin portion at 0.10 mm or more, the strength of the lens as a whole can be secured by the peripheral zone to the extent not to impair the shape retention capacity of the lens. On the other hand, by setting the minimum thickness of the thin portion at 0.20 or less, the foreign-body sensation caused by the thin portion being tucked under the upper and lower eyelids can be alleviated more effectively.

A twelfth mode of the present invention provides the contact lens according to any one of the first through eleventh modes, wherein the maximum thickness of the thick portion is set in a range of 0.20 mm to 0.45 mm.

By setting the maximum thickness of the thick portion at 0.20 mm or more, the strength of the lens can be secured, and the effect of turn restrictions caused by the push-out action and the like of the upper eyelid on the thick portion can be exerted in a more stable manner. On the other hand, by setting the maximum thickness of the thick portion at 0.45 mm or less, excessive contact of the upper eyelid with the thick portion can be restricted to achieve a more comfortable wearing sensation.

A thirteenth mode of the present invention provides the contact lens according to any one of the first through twelfth modes, wherein an anterior surface of the optical zone and the peripheral zone is made to form a rotating body around the lens central axis, and a particular axis in a radial direction is set in connection with optical properties of the optical zone by having posterior surfaces of the optical zone and peripheral zone made to form a non-rotating body around the lens central axis, while the pair of thin portions, the pair of thick portions, and the concavity in each of the thick portions are provided in the peripheral zone.

According to this mode, an optical zone having an optical directionality and a peripheral zone that specifies the directionality of the lens during wear are both formed on the posterior surface of the lens. Therefore, in molding a desired contact lens using a lens mold that forms a molding cavity combining the molds on the anterior and posterior surfaces of the lens, the directionality at the optical zone and in the peripheral zone in the circumferential direction are both specified and set at the same mold on the posterior surface of the lens so that the directionality of the optical zone and that of the peripheral zone in the circumferential direction can be aligned in high precision with no need for a special maneuvering in the process of lens manufacturing. Then, since the anterior surface of the lens is made to form a rotating body, relative positioning between the molds on the anterior and posterior surfaces of the lens in the circumferential direction can be dispensed of, thus achieving better production efficiency. In addition, since sharing the mold on the posterior surface of the lens where the directionality at the optical zone and that in the peripheral zone in the circumferential direction are specified makes it possible to mold lenses with various diopters by means of solely varying the mold on the anterior surface of the lens in a form of rotating body, the number of standards for producing such a mold and even a metal mold for producing said mold can be reduced, thus improving the productivity.

A fourteenth mode of the present invention provides the contact lens according to any one of the first through thirteenth modes, wherein the optical zone is that of a toric lens, a bifocal lens, a multifocal lens, a tonic bifocal lens, a toric multi-focal lens, a decentered toric lens, a decentered bifocal lens, a decentered multi-focal lens, a decentered tonic bifocal lens, or a decentered toric multi-focal lens.

Among these various lenses, especially the present invention can be adopted favorably in those with a particular axis in the radial direction set in connection with the optical properties. For example, the tonic lens requires high-precision and stable alignment with respect to the relative positioning with the astigmatism axis of the eyeball and the cylinder axis of the optical zone. Then, according to the present invention, almost the same effect of turn restrictions as that of the conventional double thin type can be exerted so that such is adopted favorably in these lenses with a particular axis in the radial direction, thus improving the oxygen permeability and enhancing wearing sensation while exerting the effect of turn restrictions to almost the same extent as the conventional lens. Meanwhile, it is also possible to adopt an optical zone properly combining a toric lens with a bifocal or a multi-focal lens, or even different spherical diopters, and those lenses are included in this mode.

Effect of the Invention

With the present invention, it is possible to reduce the pressure of the thick portion so as to enhance the wearing sensation and improve the oxygen permeability at the thick portion by means of forming a concavity in each of the thick portions located in the left and right sides of the lens during wear and partially thinning those thick portions. In addition, forming a concavity and partially reducing the strength of the lens at the thick portion makes it possible to generate flexural deformation at the time of blinking, and by virtue of increased displacement of the lens and the pumping action based on this flexural deformation and the restoration from it, the tear exchange can be improved.

BRIEF DESCRIPTION OF THE DRAWINGS

FIG. 6 is a diagram showing varying thickness of a peripheral zone of a contact lens according to a second embodiment of the present invention.

FIG. 7 is a diagram showing varying thickness of a peripheral zone of a contact lens according to a third embodiment of the present invention.

FIG. 8 is a diagram showing varying thickness of a peripheral zone of a contact lens according to a fourth embodiment of the present invention.

FIG. 9 is a diagram showing varying thickness of a peripheral zone of a contact lens according to a fifth embodiment of the present invention.

FIG. 10 is a diagram showing thickness distributions of an example and comparative example.

EMBODIMENTS FOR CARRYING OUT THE INVENTION

Embodiments of the present invention will be explained below with reference to attached drawings.

Figure 1:
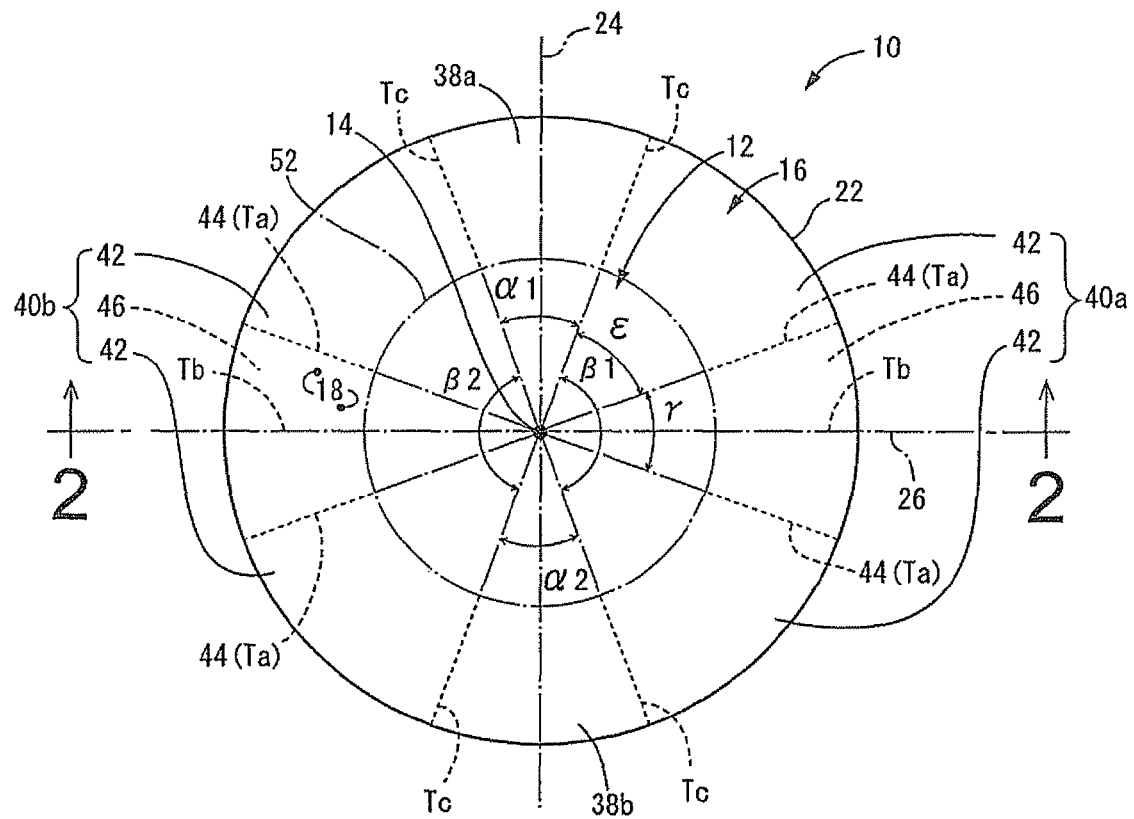
FIG. 1 is a front view of a contact lens according to a first embodiment of the present invention.
Figure 2:
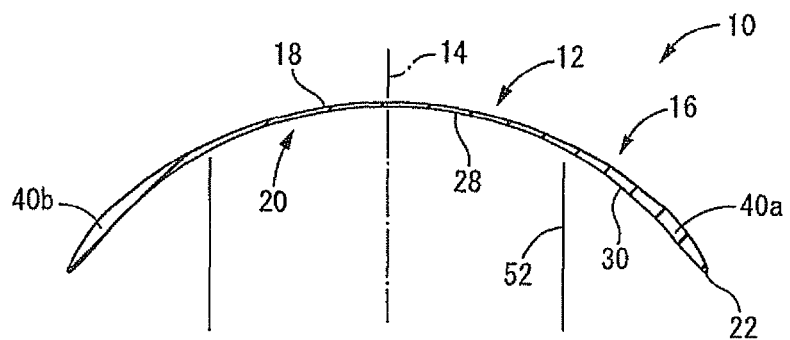
FIG. 2 is a cross sectional view taken along line 2-2 of FIG. 1.

First, FIGS. 1 and 2 show a contact lens 10 as a first embodiment of the present invention. The contact lens 10, in an approximate form of a partial spherical shell as a whole, is to be used by wearing over the cornea of the eyeball as is well known. Meanwhile, the present invention can be applied to both soft type and hard type contact lenses, but the contact lens 10 of this embodiment is a soft type contact lens and its material is not restricted to any specific one, and materials including those conventionally known with water content such as PHEMA (polyhydroxyethyl methacrylate) and PVP (polyvinylpyrrolidone) as well as materials with no water content such as acrylic rubber and silicone can be adopted.

The contact lens 10 is in a circular form in the front view of FIG. 1, wherein an optical zone 12 as a vision correction optical system is formed at the center of the lens in a circular form extending along a lens central axis 14, which is the geometric center axis of the outline thereof. Also, in the peripheral part of the lens, a peripheral zone 16 as a non-optical domain is formed on the lens central axis 14 in an annular form with a given width surrounding the optical zone 12. Further, in the outer periphery of the lens, an edge portion 22 that smoothly connects a lens anterior surface 18 in an approximate form of a spherical convex and a lens posterior surface 20 in an approximate form of an aspheric concave is formed in an annular form all around the circumference.

Meanwhile, the contact lens 10 is made in a line-symmetric form with respect to a vertical radial line 24 passing through the lens central axis 14, and the vertical radial line 24 is made to extend approximately in the vertical up-down direction of the lens during wear. Also, a horizontal radial line 26 perpendicular to the vertical radial line 24 passing through the lens central axis 14 is made to extend approximately in the horizontal left-right direction of the lens during wear.

The lens anterior surface 18 can adopt any form including the ones with a radial cross section expressed by a multi-order polynomial, but especially in this embodiment, the lens anterior surface 18 is made to have a cross section in an approximate form of a convex arc having a near constant curvature radius to form a rotating body around the lens central axis 14. On the other hand, the lens posterior surface 20 is made to form a non-rotating body around the lens central axis 14 comprising an optical zone posterior surface 28 in a circular form in front view and a peripheral zone posterior surface 30 in an annular form in front view. The optical zone posterior surface 28 and the peripheral zone posterior surface 30 have peripheral edges in a coaxial circular form around the lens central axis 14, and are formed in sequence from the inner to outer side in the radial direction. This allows the contact lens 10 to be structurally configured with the optical zone 12 with its posterior surface formed by the optical zone posterior surface 28, the peripheral zone 16 with its posterior surface formed by the peripheral zone posterior surface 30, and the edge portion 22 located along the outermost peripheral edge connecting the lens anterior and posterior surfaces 18 and 20.

Meanwhile, the peripheral zone 16 is preferably formed at a location in the range of 0.02 mm to 5.0 mm away from the outer peripheral edge of the contact lens 10 in the radial direction, and is more preferably formed at a location in the range of 0.04 mm to 4.0 mm therefrom. By forming the peripheral zone 16 at a location in the range of 0.02 mm or more from the outer peripheral edge of the lens in the radial direction, the width of the edge portion 22 can be properly secured to smoothly connect the lens anterior surface 18 and lens posterior surface 20, whereas, by forming the peripheral zone 16 at a location in the range of 5.0 mm or less from the outer peripheral edge of the lens in the radial direction, the forming area of the optical zone 12 is secured to obtain effective vision correction effects.

The optical zone posterior surface 28 can adopt a spherical surface with a proper curvature radius or an aspheric surface, as it can achieve, in cooperation with the lens anterior surface 18, diopters of monofocal lenses and multifocal lenses with two or more foci, for example, as part of its optical properties such as required functions of vision correction. Especially in this embodiment, a toric surface is formed on the optical zone posterior surface 28 with a particular axis in the radial direction set in connection with the optical properties, and by forming the lens anterior surface 18 and optical zone posterior surface 28 on the same lens central axis 14, the optical zone 12 is made to be a toric lens with the diopter of a cylindrical lens. However, the optical zone 12 can also be, for example, an aspheric lens or spherical lens having a spherical diopter with no directionality, a bifocal lens that offers two foci, a multi-focal lens that offers three or more foci, or even a toric bifocal lens or a toric multi-focal lens made by combining the above with a toric lens. In addition, the optical zone 12 can be a decentered type wherein the optical center is off centered from the geometric center of the lens such as the decentered toric lens, decentered bifocal lens, decentered multi-focal lens, decentered tonic bifocal lens, and decentered tonic multi-focal lens and so forth.

Also, the optical zone 12 has its geometric central axis equally positioned to the lens central axis 14 by having the lens anterior surface 18 and optical zone posterior surface 28 formed on the same lens central axis 14. At the same time, the center of gravity of the optical zone 12 is positioned on the geometric central axis thereof by having the thicknesses of the optical zone 12 approximately equal to each other at symmetrical positions with respect to the lens central axis 14. As evident from the above, the optical zone 12 of the contact lens 10 in this embodiment is not provided with a prism for the purpose of stabilizing the circumferential position by means of deviating the center of gravity downward.

Meanwhile, since the peripheral zone 16 does not affect optical properties of the contact lens 10, its form can be set with no restriction of required optical properties. Thus, it is possible to set a form of the peripheral zone posterior surface 30 so as to promote stability and a comfortable wearing sensation of the contact lens 10 during wear in a favorable manner.

Figure 3:
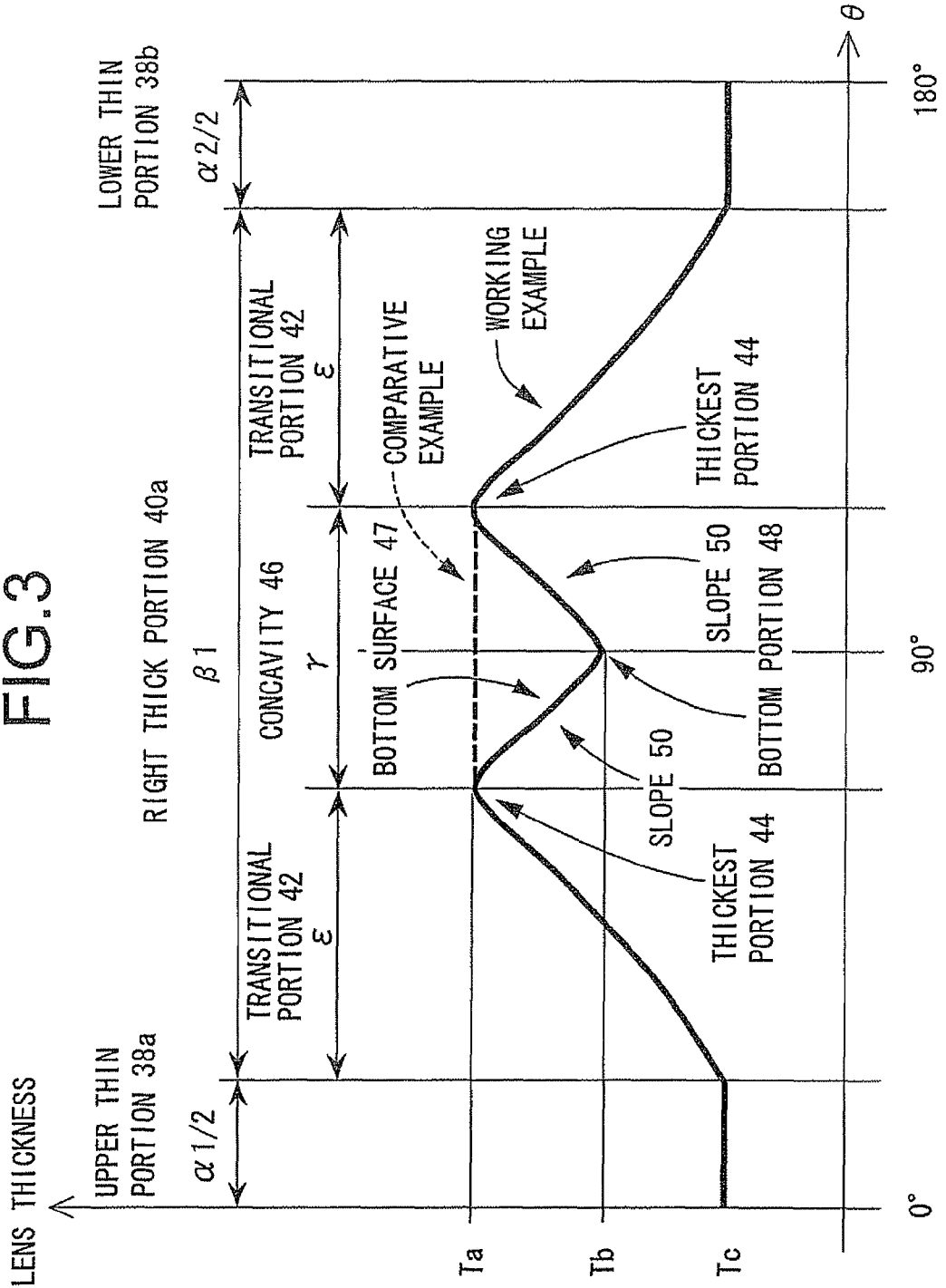
FIG. 3 is a diagram showing varying thickness of a peripheral zone of the contact lens shown in FIG. 1.
Figure 4:
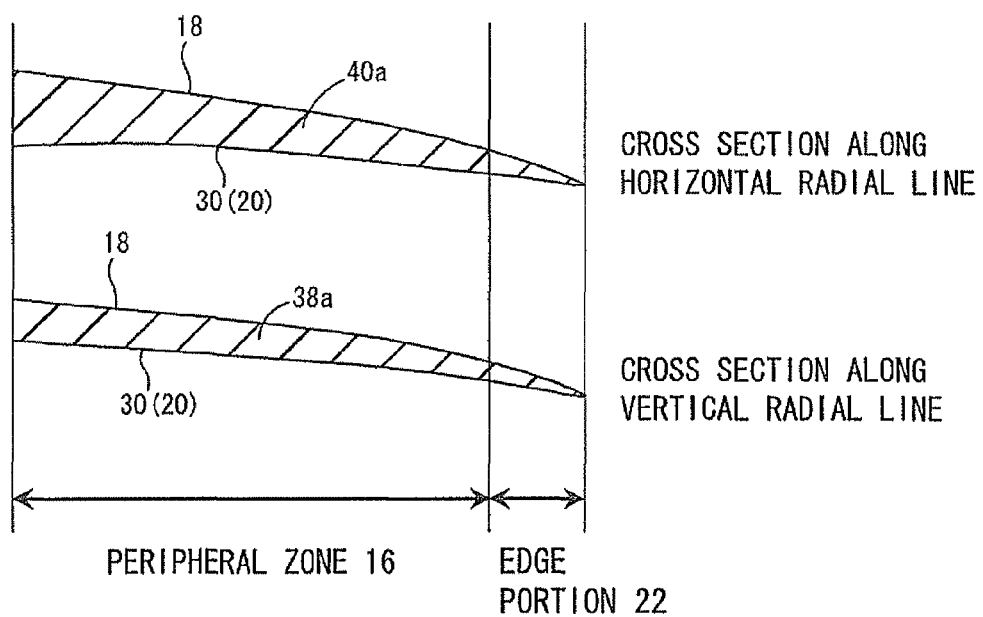
FIG. 4 is a cross-sectional diagram showing the peripheral zone of the above contact lens.

The peripheral zone posterior surface 30 of this embodiment is formed so as to vary the thickness of the peripheral zone 16 in a circumferential direction. FIG. 3 schematically shows varying thickness of the peripheral zone 16 in the circumferential direction. Also, FIG. 3 shows changes in the thickness along half the circumference on the right side of the lens during wear in front view, and its 12 o'clock position is defined as zero. Therefore, the vertical radial line 24 passes through the positions of 0 and 180 degrees whereas the horizontal radial line 26 passes through the positions of 90 degrees of the lens during wear. Also, as mentioned below, the peripheral zone 16 of this embodiment is formed in symmetry with respect to the vertical radial line 24 so that the changes in the thickness along half the circumference on the left side of the lens during wear in front view would be the same as shown in FIG. 3. Meanwhile, the thickness of the peripheral zone 16 varies also in the radial direction of the lens (left-right direction in FIG. 4) as schematically shown in FIG. 4 as a cross section along the horizontal radial line 26 (with a concavity 46 described later not formed) and a cross section along the vertical radial line 24 of the peripheral zone 16, and in general, the thickness decreases as it goes outward in the radial direction of the lens. Therefore, FIG. 3 shows variation of thickness in the circumferential direction at a location away from the lens central axis 14 by a given distance in the radial direction. Also, the dotted line in FIG. 3 shows the comparative example described below.

In the peripheral zone 16 in both the upper and lower portions of the lens during wear, an upper thin portion 38a and a lower thin portion 38b that are made relatively thin are formed. Then, at the locations in the peripheral zone 16 on the left and right sides of the lens during wear between the upper thin portion 38a and lower thin portion 38b in the circumferential direction, a right thick portion 40a and a left thick portion 40b are formed extending in the circumferential direction with larger thickness than the thin portions 38a and 38b. Here, the one located on the right side (right in FIG. 1) in front view of the lens during wear is called the right thick portion 40a, whereas the one located on the left side (left in FIG. 1) is called the left thick portion 40b.

The upper thin portion 38a and lower thin portion 38b, each extending in the circumferential direction with a constant cross section in the radial direction, are formed with a constant thickness Tc in a given length in the circumferential direction in the peripheral zone 16. The thickness Tc can vary between the upper thin portion 38a and the lower thin portion 38b, but it happens to be equal to each other in this embodiment. Thus the thickness Tc of the thin portions 38a and 38b can be different from each other, and this thickness varies even in the radial direction of the lens in each of the upper thin portion 38a and lower thin portion 38b as shown in FIG. 4. There, the minimum thickness in all the thin portions 38a and 38b (except the edge portion 22) is preferably set in the range of 0.10 mm to 0.20 mm, and more preferably in the range of 0.13 mm to 0.17 mm. By setting the minimum thickness of the thin portions 38a and 38b to 0.10 mm or more, the strength of the thin portions 38a and 38b can be secured, and by setting the minimum thickness to 0.20 mm or less, the foreign-body sensation can be alleviated at the time of having the lens tucked under the upper or lower eyelid.

The left and right ends of the upper thin portion 38a and lower thin portion 38b in the circumferential direction are defined by a given thickness Tc. A central angle α1 between the left and right ends of the upper thin portion 38a in the circumferential direction and a central angle α2 between the left and right ends of the lower thin portion 38b are each preferably set in the range of 20 to 60 degrees, and more preferably in the range of 30 to 50 degrees. By setting the central angles α1 and α2 of the thin portions 38a and 38b to 20 degrees or more, the foreign-body sensation at the time of having the lens tucked under the upper or lower eyelid can be alleviated, and at the same time, by setting the central angle α1 and α2 to 60 degrees or less, the strength of the lens can be secured.

In this embodiment, the central angle α1 of the upper thin portion 38a around the lens central axis 14 and the central angle α2 of the lower thin portion 38b around the same are set equal to each other. Besides, the upper and lower thin portions 38a and 38b are each located with its central portion in the circumferential direction positioned on the vertical radial line 24. This allows each of the upper thin portion 38a and lower thin portion 38b to be formed in 3-dimensional mirror symmetry with respect to a plane that extends in the direction of the lens optical axis passing through the vertical radial line 24 (a plane including the vertical radial line 24 and the lens optical axis), and at the same time, the upper and lower thin portions 38a and 38b are made in a form of 3-dimensional mirror symmetry to each other with respect to a plane that extends in the direction of the lens optical axis passing through the horizontal radial line 26 (a plane including the horizontal radial line 26 and the lens optical axis).

However, the central angle α1 of the upper thin portion 38a and the central angle α2 of the lower thin portion 38b can be different from each other. In that case, it is preferable to assume (the central angle α1)>(the central angle α2,), that is, to set the dimension of the upper thin portion 38a larger than the lower thin portion 38b in the circumferential direction. This makes it possible to reduce the amount of tucking of the lower thin portion 38b under the tower eyelid and to form the upper thin portion 38a larger, which overlaps the upper eyelid that has a more extensive overlap with the contact lens 10 and moves more widely than the lower eyelid at the time of blinking, which further enhances the wearing sensation.

On the other hand, the right thick portion 40a and the left thick portion 40b are formed in a given length in the circumferential direction in the peripheral zone 16 with larger thickness than that of the upper thin portion 38a and the lower thin portion 38b. On both sides in the circumferential direction in each of the thick portions 40a and 40b, a pair of transitional portions 42 and 42 with decreasing thickness toward the thin portions 38a and 38b in the circumferential direction are formed. Then, one side of each transitional portion 42 in the circumferential direction is connected to the upper thin portion 38a or the lower thin portion 38b, whereas the other side in the circumferential direction is connected to a thickest portion 44 having the maximum thickness Ta in each of the thick portions 40a and 40b. Therefore, the thicknesses of the thick portions 40a and 40b are made to vary gradually by the transitional portions 42 and 42 formed on both sides thereof in the circumferential direction from the thickness Ta of the thickest portion 44 to the thickness Tc of the thin portions 38a and 38b in the circumferential direction.

In this embodiment, the maximum thickness Ta of the right thick portion 40a and the maximum thickness Ta of the left thick portion 40b are made equal to each other, but they can be made different from each other. Then, as is the case for the above thin portions 38a and 38b, the thickness varies in the radial direction of the lens in each of the right thick portion 40a and the left thick portion 40b as shown in FIG. 4. There, the maximum thickness in all the thick portions 40a and 40b (except the edge portion 22) is preferably set in the range of 0.20 mm to 0.45 mm, more preferably in the range of 0.23 mm to 0.42 mm. By setting the maximum thickness of the thick portions 40a and 40b to 0.20 mm or more, the strength of the lens is secured, whereas, by setting the maximum thickness to 0.45 mm or less, further enhancement of the wearing sensation can be assured.

The upper and lower ends of the right thick portion 40a and the left thick portion 40b in the circumferential direction are defined by the thickness Tc at the edges of the upper thin portion 38a and the lower thin portion 38b in the circumferential direction. The central angle β1 between the upper and lower ends of the right thick portion 40a and the central angle β2 between the upper and lower ends of the left thick portion 40b in the circumferential direction around the lens central axis 14 are each preferably set in the range of 120 to 160 degrees, more preferably in the range of 130 to 150 degrees. By setting the central angles β1 and β2 to 120 degrees or more, the effect of turn restrictions caused by the push-out action of the upper eyelid can be exerted in a stable manner, and at the same time, by setting the central angles β1 and β2 to 160 degrees or less, the dimensions of the thin portions 38a and 38b in the circumferential direction can be maintained to secure the oxygen permeability of the contact lens 10.

Then, the concavity 46 is formed on the peripheral zone posterior surface 30 of the thick portions 40a and 40b. The concavity 46 is formed in a shape of concavity made on the peripheral zone posterior surface 30 and is opened up thereto. The number of the concavity 46 formed in each of the thick portions 40a and 40b is not restricted and the concavity 46 can be formed in plurality, but in this embodiment, it is formed one each at the midpoint of each of the thick portions 40a and 40b in the circumferential direction stretching over the thickest portions 44 and 44. Therefore, the right and left thick portions 40a and 40b in this embodiment are each made to be a transitional portion, as a whole, that changes the thickness in the circumferential direction by having the end of the transitional portion 42 toward the center in the circumferential direction connected to the concavity 46 at the thickest portion 44.

The concavity 46 is formed symmetrically in the up-down direction (left-right direction in FIG. 3) of the lens during wear in the cross sections of the thick portions 40a and 40b in the circumferential direction. A bottom surface 47 of the concavity 46 in this embodiment is made in a form of a double taper having slopes 50 and 50 that gradually reduce the depth as they go out toward the periphery on both sides of a bottom portion 48 which is the deepest of all.

The thickness at the formation of the concavity 46 is assumed to be the smallest at the bottom portion 48, and the minimum thickness Tb at the formation of the concavity 46 is set larger than the thickness Tc of the thin portions 38a and 38b.

This enables to maintain the shape retention capacity of the contact lens 10. In addition, the minimum thickness Tb at the formation of the concavity 46 is preferably set to ½ to 9/10 of the maximum thickness Ta of the thick portions 40a and 40b. By setting the minimum thickness Tb at the formation of the concavity 46 to ½ or more of the maximum thickness Ta of the thick portions 40a and 40b, it is possible to maintain morphological stability of the contact lens 10 and to prevent the concavity 46 from getting too deep, thus making the fabrication of molds and metal molds for casting said molds, described later, easier. Also, by setting the minimum thickness of Tb at the formation of the concavity 46 to 9/10 or less of the maximum thickness Ta of the thick portions 40a and 40b, it is possible to effectively obtain effects of improved oxygen permeability and enhanced wearing sensation by virtue of thinning the formation of the concavity 46.

Also, the central angle γ at the concavity 46 around the lens central axis 14 is preferably set in the range of 20 to 60 degrees, more preferably in the range of 30 to 50 degrees. By setting the central angle γ at the concavity 46 to 20 degrees or more, the length of the concavity 46 in the circumferential direction can be properly maintained to facilitate an effect of improved oxygen permeability and the flexural deformation due to the concavity 46, whereas, by setting the central angle γ at the concavity 46 to 60 degrees or less, the strength of the lens at the thick portions 40a and 40b can be secured.

Moreover, as mentioned above, each of the thick portions 40a and 40b changes its thickness gradually from Tc to Ta (or from Ta to Tc) at the transitional portion 42 due to the inclination of the transitional portion 42 in the circumferential direction. The inclination angle of the transitional portion 42 in the circumferential direction is deemed to represent changes in thickness per unit length in the circumferential direction, and more specifically, is expressed by (Ta−Tc)/ϵ, assuming the central angle of the transitional portion 42 between the upper and lower ends in the circumferential direction is ε. On the other hand, each of the thick portions 40a and 40b gradually changes its thickness from Ta to Tb (or from Tb to Ta) at the slope 50 due to the inclination of the slope 50 of the concavity 46 in the circumferential direction. Since the slope 50 runs half way through the concavity 46, the inclination angle of the slope 50 in the circumferential direction can be expressed by (Ta−Tb)/(γ/2) in the same way as the transitional portion 42. Then, the inclination angle (Ta−Tb)/(γ/2) of the slope 50 of the concavity 46 in the circumferential direction is preferably set to the inclination angle of the transitional portion 42 in the circumferential direction (Ta−Tc)/ε or more. In short, the inclination of the slope 50 of the concavity 46 is preferably set to no less than that of the transitional portion 42 in FIG. 3. This way, it is possible to maintain a certain depth of the concavity 46 without increasing the dimension thereof in the circumferential direction, thus improving the design freedom in forming the concavity 46.

Also, the right and left thick portions 40a and 40b as a whole including the concavity 46 and the transitional portions 42 and 42 are each in a form of 3-dimensional mirror symmetry with respect to a plane that includes the horizontal radial line 26 and the lens optical axis. Then, the right and left thick portions 40a and 40b are configured in such a way that the bottom portion 48 of the concavity 46 formed at the center in the circumferential direction is positioned on the horizontal radial line 26 of the lens during wear, and the concavity 46 of the right thick portion 40a and that of the left thick portion 40b are made symmetrical to each other in the left-right direction on the horizontal radial line 26 during wear. In addition, the central angle β1 of the right thick portion 40a and the central angle β2 of the left thick portion 40b are made equal to each other, which makes the right and left thick portions 40a and 40b in a form of 3-dimensional mirror symmetry to each other with respect to a plane that includes the vertical radial line 24 and the lens optical axis.

Meanwhile, the central angle β1 of the right thick portion 40a and the central angle β2 of the left thick portion 40b can be made different from each other. For example, since the distance between the upper and lower eyelids of a human eye tends to get smaller toward the nose than toward the ear when the eye is open as usual, it is possible, in response to it, to further improve the wearing sensation and positioning accuracy in the circumferential direction due to the eyelid action by means of setting the circumferential length (central angle) of the lens during wear on the nose side smaller than that of the ear side in either the right thick portion 40a or the left thick portion 40b.

Also, in order to achieve an even better wearing sensation, it is preferable to make the peripheral zone posterior surface 30 in a smooth form without any bend in the cross section in the radial direction of the lens. More preferably, it is in a continuous and smooth form without any edgy bend by having the inclination angle of the tangent line continuously vary in the radial direction substantially all across the lens posterior surface 20 including a junction 52, which is a connection boundary between the optical zone posterior surface 28 and the peripheral zone posterior surface 30.

The contact lens 10 described above has a concavity 46 formed in each of the right thick portion 40a and the left thick portion 40b and is able to alleviate the foreign-body sensation caused by the pressure of the thick portions 40a and 40b by means of partially reducing the thickness thereof on both sides. Especially since the concavity 46 opens up on the lens posterior surface 20, it is possible to alleviate the pressure caused by an pinguecula by means of forming the concavity 46 at a position corresponding to the pinguecula, for example. In addition, by reducing the thickness of the thick portions 40a and 40b on both sides at the formation of the concavity 46, it is possible to improve the oxygen permeability.

Also, by partially decreasing the strength of the thick portions 40a and 40b at the concavity 46, it is possible to give flexural deformation to the contact lens 10 folding it in the up-down direction at the time of blinking. This flexural deformation can increase the displacement of the contact lens 10 over the cornea and improve the tear exchange. Especially according to this embodiment, since the concavity 46 in each of the right thick portion 40a and the left thick portion 40b is positioned in left-right symmetry on the horizontal radial line 26, which is the center of the contact lens 10 in the up-down direction, the flexural deformation can be generated effectively.

Besides, uneven distribution of the rigidity between the thick portions 40a, 40b and the thin portions 38a, 38b can be alleviated, thus improving the shape retention capacity of the lens. As a result, the problem of having the lens curled up on one's finger in an attempt to wear it can be alleviated.

Also, the contact lens 10 according to this embodiment is in an overall form of a double-thin type comprising the thin portions 38a, 38b on the upper and lower sides and the thick portions 40a, 40b on the left and right sides. This enables to obtain the effect of turn restrictions almost to the same extent as the conventional double-thin type. Therefore, it can be favorably adopted in some lenses, such as a toric lens and the like for which a particular radial axis is set in connection with the optical properties of the optical zone 12.

In addition, the thin portions 38a, 38b on the upper and lower sides and the thick portions 40a, 40b on the left and right sides are in a symmetrical form with respect to both the horizontal radial line 26 and the vertical radial line 24, including the concavity 46. This allows the concavity 46 to be arranged in a good balance in both up-down and left-right directions so as to improve the oxygen permeability in a good balance in both up-down and left-right directions while generating the flexural deformation in a stable manner. At the same time, by setting the thickness of the peripheral zone 16 in a good balance in both up-down and left-right directions, an even better effect of turn restrictions can be obtained.

Meanwhile, the contact lens 10 with the structure described above can be formed by means of directly cutting a block made from appropriate materials through polymerization molding in advance, but considering mass productivity and stable product quality, it can be favorably manufactured by molding or a combination of molding and cutting.

Figure 5:
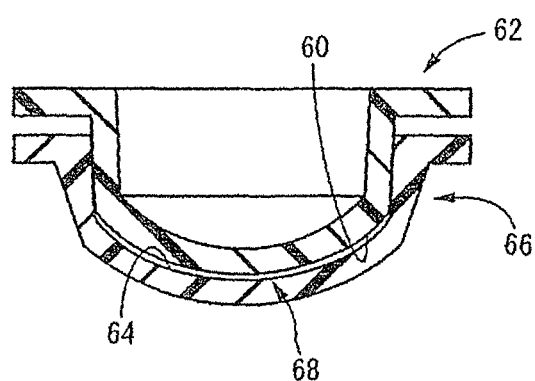
FIG. 5 is a cross sectional view showing a mold for manufacturing the above contact lens.

More specifically, in manufacturing the contact lens 10 using a synthetic resin mold, a male mold 62 having a mold surface 60 in an aspheric convex form corresponding to the lens posterior surface 20 and a female mold 66 having a mold surface 64 in a spherical concave form corresponding to the lens anterior surface 18 are used, as shown in FIG. 5. Then, by means of matching the male and female molds 62 and 66 with each other, a substantially water-tight mold cavity 68 is created between the two mold surfaces 60, 64. By making prescribed monomers for polymerization within this mold cavity 68, a method of molding can favorably be adopted for manufacturing the contact lens 10 provided with the intended anterior and posterior surfaces 18 and 20.

As described above, the intended contact lens 10 has its lens anterior surface 18 in a form of rotating body, whereas its lens posterior surface 20 is in a form of non-rotating body having the optical zone posterior surface 28 and the peripheral zone posterior surface 30. This allows both the non-rotating body of the optical zone 12 as well as the thin portions 38a, 38b and the thick portions 40a, 40b to be formed by the lens posterior surface 20. Therefore, by properly setting a form of the mold surface 60 of the male mold 62 that determines the surface configuration of the lens posterior surface 20, the male mold 62 in which positioning in the circumferential direction is already done between the optical zone 12 and those thin portions 38a, 38b and the thick portions 40a, 40b can be obtained, thus enabling a high-precision positioning in the circumferential direction.

In addition, since the lens anterior surface 18 is in a form of rotating body, there is no need for positioning the molds 62 and 66 in the circumferential direction. Also, even in manufacturing various types of contact lenses with different cylindrical diopters of the optical zone 12, for example, one can deal with it by preparing several kinds of male molds 62 that determine the form of the lens posterior surface 20 and share the female mold 66 that determines the form of the lens anterior surface 18. Therefore, the number of metal molds for producing the male and female molds 62 and 66 can be saved significantly and the intended contact lens 10 can be favorably manufactured with good processing efficiency and precision.

Embodiments of the present invention have been described above, but they are just examples, and the present invention should not be construed as limited by specific descriptions of such embodiments. Several different embodiments of the present invention are shown below, which does not mean specific aspects of the present invention are limited to those. Meanwhile, since each of the embodiments shown in FIGS. 6 through 9 only differs from the above first embodiment in its specific form of the thick portion including the concavity, drawings corresponding to FIG. 3 for the first embodiment will be shown, and the same part names and numerals as the above first embodiment will be used in the descriptions.

First, FIG. 6 shows a contact lens according to the second embodiment of the present invention. In the thick portion 40 of this embodiment, a continuous portion 70 that extends in the circumferential direction with a constant thickness Ta is formed at the center sandwiched by the transitional portions 42 and 42 in the circumferential direction on both sides thereof. The thickness Ta of the continuous portion 70 is assumed to be the maximum thickness dimension of the thick portion 40 in the circumferential direction. Also, a concavity 72 is formed at the center of the continuous portion 70 in the circumferential direction. According to this embodiment, the thickness of the thick portion 40 can be maintained at the continuous portion 70 to obtain a better shape retention capacity of the lens and a better effect of turn restrictions. Then, by having the maximum thickness and formation of the concavity 72 at the center in the circumferential direction of the continuous portion 70 with relatively low oxygen permeability, the oxygen permeability of the thick portion 40 can be effectively improved.

Meanwhile, the central angle Δ of the continuous portion 70 around the lens central axis 14 is preferably set in the range of 40 to 70 degrees, more preferably in the range of 50 to 60 degrees. By setting the central angle Δ of the continuous portion 70 to 40 degrees or more, it is possible to maintain the thickness of the thick portion 40 and obtain a better shape retention capacity of the lens and a better effect of turn restrictions, whereas, by setting the central angle Δ of the continuous portion 70 to 70 degrees or less, it is possible to reduce the foreign-body sensation caused by the pressure of the continuous portion 70.

Next, FIG. 7 shows a contact lens according to the third embodiment of the present invention. In this embodiment, the transitional portions 42 and 42 on both sides of the thick portion 40 in the circumferential direction are each connected to the thin portion 38 and the thickest portion 44 in a smooth way without any edgy bend in cross section in the circumferential direction. This enables to further alleviate the foreign-body sensation of the lens during wear and obtain a better wearing sensation. Also, a concavity 80 according to this embodiment is made in a curved concave form in cross section in the circumferential direction. This allows the concavity 80 to keep its volume larger and reduce its pressure against the pinguecula and the like, for example. Meanwhile, at the center of the bottom surface 47 of the concavity 80 in the circumferential direction, a central protrusion 82 is formed slightly protruding out in the direction of the opening on the concavity 80 (upward in FIG. 7), and a pair of bottom portions 48 and 48 with the minimum thickness Tb are formed on both sides sandwiching the central protrusion 82 in the circumferential direction. This way, it is also possible to form portions of minimum thickness at several locations of the formation of the concavity.

In addition, FIG. 8 shows a contact lens according to the fourth embodiment of the present invention. In this embodiment, three concavities 90, 90 and 90 are formed in sequence in the circumferential direction in one thick portion 40. These concavities 90, 90 and 90 are made in approximately the same form. Moreover, the thick portion 40 of this embodiment, including these three concavities 90, 90 and 90, is in a form of symmetry with respect to the horizontal radial line 26. As evident from this embodiment, it is possible to form multiple concavities in a single thick portion. This way, the oxygen permeability and the amount of flexural deformation at the time of blinking in the thick portion 40 can be set at a higher level.

Also, FIG. 9 shows a contact lens according to the fifth embodiment of the present invention. In the thick portion 40 of this embodiment, a concavity 102 which is located at the center in the circumferential direction, and a pair of concavities 104 located on both sides in the circumferential direction of the concavity 102 are formed. The cross section of the concavity 102 in the circumferential direction is made in an approximate form of a "V" that is symmetrical in the circumferential direction, whereas the cross sections of the pair of concavities 104 in the circumferential direction are each made in an approximate form of a "V" that is asymmetrical in the circumferential direction with a larger depth at the center in the circumferential direction than that toward the outer periphery. Then, the depth of the concavity 102 is made larger than that of the pair of concavities 104, whereas the thickness of the bottom portion 48 of the concavity 102 is assumed to be the minimum thickness Tb at the formation of the concavities 102 and 104. Meanwhile, the minimum thickness Tb at the formation of concavities 102 and 104 in this embodiment is made larger than ½ of the maximum thickness Ta of the thick portion 40.

As evident from this embodiment, the cross sectional configuration of the concavity in the circumferential direction is not limited to those symmetrical in the same direction. Meanwhile, it is possible to consider the concavities 102 and 104 of this embodiment as a single concavity and deem it as having a symmetrical form with respect to the horizontal radial line 26.

As mentioned above, each embodiment described above is just an example. For example, the specific form of the concavity is not limited to those described above, and is to be set as appropriate in consideration of the required oxygen permeability and the amount of displacement of the lens and the like. Then, as mentioned above, in case of forming a plurality of concavities in the thick portion, the specific forms of those concavities can be made similar to each other or different from each other. In addition, in forming multiple concavities in the thick portion, they do not necessarily have to be positioned symmetrically in the up-down direction in the thick portion of the lens during wear, and can be positioned off-centered in the up-down direction during wear.

Also, in the above thick portion, the pair of transitional portions formed on both sides in the circumferential direction are not limited to those having a symmetrical form with respect to the horizontal radial line, but, for example, their dimensions in the circumferential direction can be different from each other, or the thicknesses at both ends of the pair of transitional portions in the circumferential direction can be different from each other by means of making the thicknesses of the thin portions on the upper and lower sides different from each other or the like.

In addition, in the above embodiment, the optical zone and the thin and thick portions are formed by making the lens posterior surface in a form of a non-rotating body, but the non-rotating body of the optical zone and the thin and thick portions can be formed on the lens anterior surface by making the lens posterior surface in a form of a rotating body while making the lens anterior surface in a form of a non-rotating body, for example.

The specific optical properties and geometric forms in the above embodiment are just examples. The contact lens in the form according to the present invention is designed to be able to respond to various optical properties and geometric forms required by many contact lens wearers by appropriately changing the setting of various values including the outer diameter (DIA.), curvature radius of the lens posterior surface (base curve), optical properties of the optical zone, inner and outer diameters of the peripheral zone, and in many cases, the product will be introduced to the market as a series combining multiple types with changed settings of various values at appropriate intervals.

Meanwhile, the result of comparative studies using the test samples below on the usability of the contact lens with a structure according to the present invention is shown below.

First, FIG. 10 shows thickness distributions. An example with a structure according to the first embodiment and a comparative example with a structure according to the conventional configuration are prepared. The example, assuming outer diameter (DIA.)=14.5 mm, base curve (B.C.)=8.60 mm, has a concavity on the lens posterior surface as shown in FIG. 3. The example also assumes the maximum thickness Ta=0.3 mm, the minimum thickness Tb at the formation of the concavity=0.25 mm, the thickness of the thin portion Tc=0.15 mm at 6.3 mm outward from the lens central axis in the radial direction. Also it assumes the central angle α1 around the lens central axis at 40 degrees in the upper thin portion, the central angle α2 around the lens central axis at 40 degrees in the lower thin portion, the central angle β1 and β2 around the lens central axis at 140 degrees each in the left and right thick portions, and the central angle γ around the lens central axis at 40 degrees at the concavity.

On the contrary, the comparative example does not have the concavity of the example, and has its portion corresponding to the concavity of the example formed in a constant thickness Ta as shown by the dotted line in FIG. 3. Therefore, the comparative example is formed with the same lens material as the example, and its thickness and the central angle of each portion mentioned above are the same as the example, except for the concavity.

First, the effect of improved oxygen permeability of the example with a structure according to the present invention was studied as compared to the comparative example. The oxygen permeability is expressed by Dk/T. Here, Dk represents an oxygen permeability coefficient of the lens material $[(cm^2/sec) \cdot (ml \cdot O_2 \ (STP)/ml \cdot mmHg)]$ and T represents the lens thickness (cm). Since the example and comparative example are formed with the same lens material, the values of Dk are equal to each other. Therefore, since the ratio of the oxygen permeability of the portion having the minimum thickness at the formation of the concavity in the example to that of the corresponding portion in the comparative example is to be determined by the thickness ratio, which interprets to (comparative example):(example)=0.3 mm:0.25 mm=1:0.83, according to the present invention, it is possible to improve the oxygen permeability by 17% at the formation of the concavity over the conventional structure without such a concavity.

Next, measurements of vertical displacements of the working and comparative examples of the contact lens worn by 34 eyes of 17 users revealed the average value of the comparative examples at 0.23 mm, whereas the average value of the examples was 0.38 mm. It was confirmed that this increases the vertical displacement of the lens during wear and enhances the tear exchange when the contact lens with a structure according to the present invention is used.

Also, Table 1 shows a result of examination on the wearing sensation of the working and comparative examples of the contact lens worn by 30 eyes of 15 users. As evident from Table 1, it was confirmed that a better wearing sensation than the comparative examples is obtained using the contact lens with a structure according to the present invention.

TABLE 1

| Result | Number of eyes |
| --- | --- |
| Example is better | 8/30 eyes (27%) |
| No difference between the two | 20/30 eyes (70%) |
| Example is worse | 1/30 eyes (3%) |

| KEYS TO SYMBOLS | | | | | |
| --- | --- | --- | --- | --- | --- |
| 10: | Contact lens | 12: | Optical zone | 14: | Lens central axis |
| 16: | Peripheral zone | 18: | Lens anterior surface | 20: | Lens posterior surface |
| 22: | Edge portion | 24: | Vertical radial line | 26: | Horizontal radial line |
| 28: | Optical zone posterior surface | 30: | Peripheral zone posterior surface | | |
| 38a: | Upper thin portion | 38b: | Lower thin portion | 40a: | Right thick portion |
| 40b: | Left thick portion | 42: | Transitional portion | | |
| 46, 72, 80, 90, 102, 104: | Concavity | 47: | Bottom surface | 70: | Continuous portion |

The invention claimed is:

1. A contact lens comprising:
   a central optical zone having no deviation of a center of gravity by a prism;
   a peripheral zone surrounding the optical zone;
   a pair of thin portions that are each disposed in the peripheral zone and extend in a circumferential direction, with a constant thickness, on upper and lower sides of the lens during wear;
   a pair of thick portions that are each disposed in the peripheral zone and extend in the circumferential direction, with a larger thickness than the thin portions, on left and right sides of the lens during wear; and
   at least one concavity between a first protrusion and a second protrusion of the contact lens such that the concavity and the first and second protrusions are disposed on a posterior surface of each of the pair of thick portions, respective concavities of the at least one concavity being positioned symmetrically in a left-right direction during wear,
   wherein a minimum thickness at a portion where the at least one concavity is disposed is larger than the thickness of the thin portions.

2. The contact lens according to claim 1, wherein one of the at least one concavity in each of the thick portions is disposed on a horizontal radial line extending in the left-right direction through a lens central axis during wear.

3. The contact lens according to claim 1, wherein the pair of thin portions and the pair of thick portions, including the at least one concavity, are disposed symmetrically with respect to two radial lines including:
   a horizontal radial line extending in the left-right direction through a lens central axis during wear, and
   a vertical radial line extending in an up-down direction through the lens central axis during wear.

4. The contact lens according to claim 1, wherein the minimum thickness at the portion where the at least one concavity is disposed is set in a range of ½ to 9/10 of a maximum thickness of each of the pair of thick portions.

5. The contact lens according to claim 1, wherein opposed sides in the circumferential direction of each of the thick portions are transitional portions that gradually thin out toward the thin portions.

6. The contact lens according to claim 5, wherein a center of each of the thick portions in the circumferential direction is a continuous portion that extends in the circumferential direction at a constant thickness, and a central angle Δ around a lens central axis in the continuous portion is set in a range of 40 to 70 degrees.

7. The contact lens according to claim 5, wherein:
   a bottom surface of the at least one concavity is such that the depth of the at least one concavity gradually increases from peripheral sides of the at least one concavity in the circumferential direction to a bottom portion of the at least one concavity, and
   an inclination angle of the bottom surface of the at least one concavity is equal to or larger than an inclination angle of the transitional portions such that the inclination angles represent changes in thickness per unit length in the circumferential direction.

8. The contact lens according to claim 1, wherein a central angle α between left and right ends of each of the thin portions in the circumferential direction around a lens central axis is set in a range of 20 to 60 degrees.

9. The contact lens according to claim 1, wherein a central angle β between upper and lower ends of each of the thick portions in the circumferential direction around a lens central axis is set in a range of 120 to 160 degrees.

10. The contact lens according to claim 1, wherein a central angle γ between upper and lower ends of the at least one concavity in the circumferential direction around a lens central axis is set in a range of 20 to 60 degrees.

11. The contact lens according to claim 1, wherein a minimum thickness of each of the thin portions is set in a range of 0.10 mm to 0.20 mm.

12. The contact lens according to claim 1, wherein a maximum thickness of each of the thick portions is set in a range of 0.20 mm to 0.45 mm.

13. The contact lens according to claim 1, wherein an anterior surface of the optical zone and the peripheral zone forms a rotating body around a lens central axis, and a particular axis in a radial direction is set in connection with optical properties of the optical zone by having posterior surfaces of the optical zone and peripheral zone form a non-rotating body around the lens central axis, while the thin portions, the thick portions, and the at least one concavity in each of the thick portions are provided in the peripheral zone.

14. The contact lens according to claim 1, wherein the optical zone is a lens selected from the group comprising a tonic lens, a bifocal lens, a multifocal lens, a toric bifocal lens, a tonic multi-focal lens, a decentered tonic lens, a decentered bifocal lens, a decentered multi-focal lens, a decentered tonic bifocal lens, and a decentered tonic multi-focal lens.

15. The contact lens according to claim 1, wherein, when the contact lens is properly worn on a user's cornea, the posterior surface contacts the user's cornea.

* * * * *